H. BARBER.
DRAFT DEVICE.
APPLICATION FILED DEC. 26, 1907.
937,037.
Patented Oct. 19, 1909.
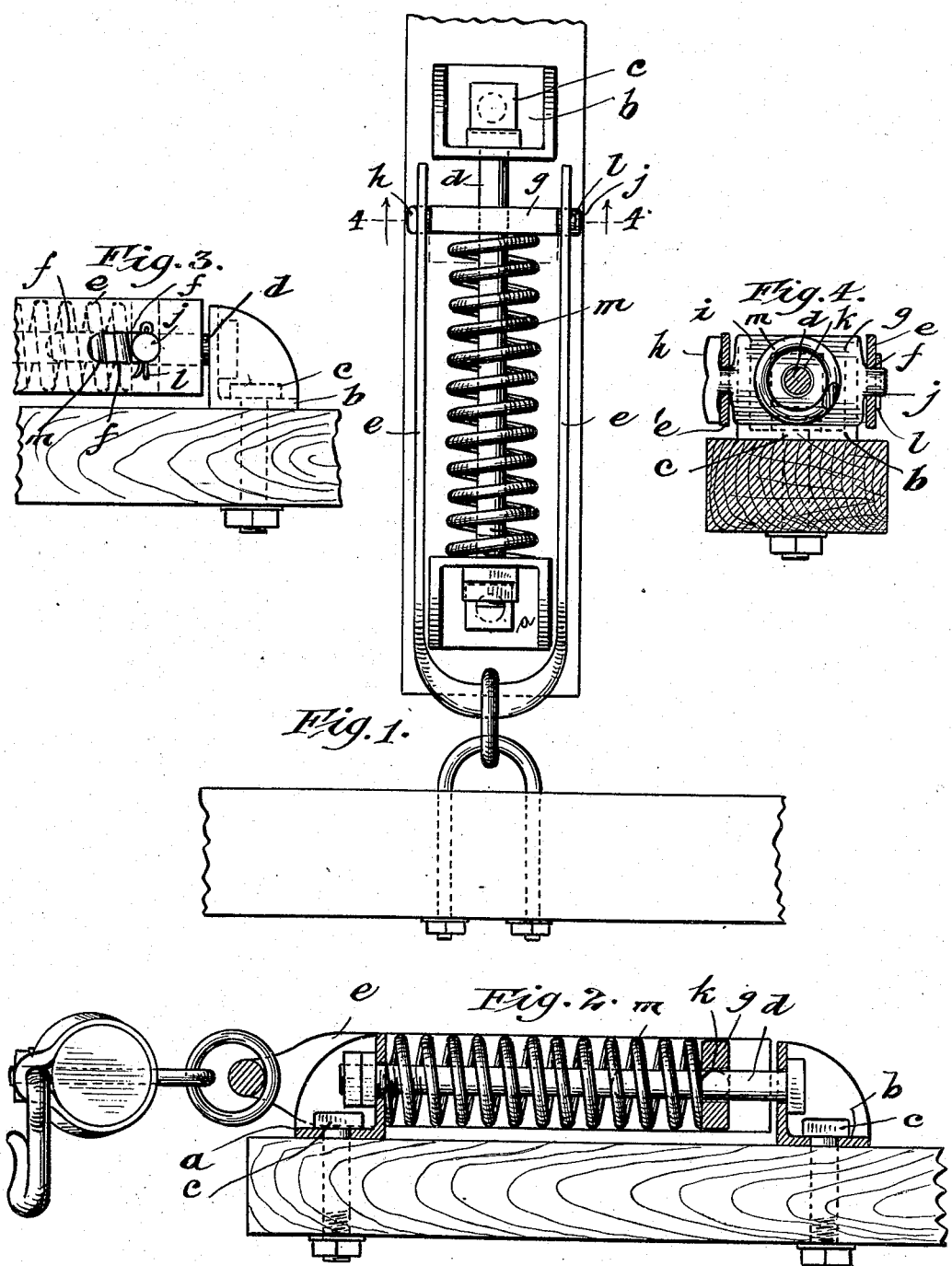
Witnesses,
S. F. Mann
Isabel MacLean
Inventor,
Hiram Barber
by Geo. F. Ort Atty

UNITED STATES PATENT OFFICE.

HIRAM BARBER, OF CHICAGO, ILLINOIS.

DRAFT DEVICE.

937,037.  Specification of Letters Patent.  Patented Oct. 19, 1909.

Application filed December 26, 1907. Serial No. 408,072.

*To all whom it may concern:*

Be it known that I, HIRAM BARBER, a citizen of the United States, residing at Chicago, county of Cook, and State of Illinois, have invented a new and useful Draft Device, of which the following is a specification.

My invention relates to improvements in draft-springs in which a draft-key, engaging with a draft-clevis, is adapted to reciprocate upon a retaining rod, with the resiliency of a spring which contacts with said draft-key, the object being to provide a rigid single bearing in combination with a vertically swinging clevis contacting therewith at the axis of resistance applied to said spring to avoid the friction incident to the application of power, and to absorb the vibrations of the resistance. I attain those objects by means of the device shown in the accompanying drawing in which:

Figure 1 is a plan view with portion of evener attached. Fig. 2 is a longitudinal section of same. Fig. 3 is a detail of the key slot in the clevis and the cotter pin in the point of the draft key. Fig. 4 is a detail of the draft-key in position.

In detail $a$ and $b$ are lugs which are provided with perforations to receive the bolts $c$ $c$, and the rod $d$, and form the frame of my device.

$e$ is a special draft clevis provided with key-slots $f$ $f$.

$g$ is the draft-key which consists integrally of the head $h$, the shank $i$ and the point $j$, and is adapted to be inserted through the key-slots $f$ $f$, and turned at right angles with said slots to receive the rod $d$ through the port $k$ provided in the shank $i$.

$l$ is a cotter pin passing through the point of the key for the purpose of retaining the contacting leg of the clevis.

$m$ is a spiral spring which is strung movably upon the rod $d$ and contacts with the lug $a$ and the broad surface of the key, so that upon the exertion of power and resistance upon the clevis, the key reciprocates upon the rod with the resiliency of the spring. It will be observed that the longitudinal strength of the legs of the clevis presents a rigid frame for the key which, in connection with the snug fit of the arms in the mesh of the slots is designed to minimize binding friction on the rod and the vertical swing of the clevis avoids any friction that would otherwise attend the reciprocations of the same.

What I claim is:

1. In draft devices the combination of a draft key reciprocating upon a single bearing-rod which is attached to the vehicle and which is sufficiently strong to absorb the lateral strain of service and a clevis which is provided with slots to receive said key and permit the same to be turned at right angles after insertion thereof and which oscillates vertically relative to said key substantially as described.

2. In draft devices, the combination with a clevis, the legs of which are provided with slots, of a draft-key which is provided with a port in the shank and is adapted to be inserted in said slots and turned at right angles thereto in order to receive a rod through said port, a spring strung upon said rod, the ends of which rod being securely fastened to the vehicle, substantially as described.

HIRAM BARBER.

Witnesses:
FRANKLIN P. SIMONS,
ISABEL MACLEAN.